US011237242B1

(12) United States Patent
Tuchel et al.

(10) Patent No.: US 11,237,242 B1
(45) Date of Patent: Feb. 1, 2022

(54) SYSTEM AND METHOD OF PROVIDING MULTIPLE ANTENNAS TO TRACK SATELLITE MOVEMENT

(71) Applicant: Space Exploration Technologies Corp., Hawthorne, CA (US)

(72) Inventors: James Alexander Morris Tuchel, Los Angeles, CA (US); Andrew Louis Burks, Long Beach, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 11 days.

(21) Appl. No.: 16/927,833

(22) Filed: Jul. 13, 2020

(51) Int. Cl.
  *G01S 19/28* (2010.01)
  *G01S 5/02* (2010.01)
  *G01S 5/00* (2006.01)
  *H04B 7/185* (2006.01)

(52) U.S. Cl.
  CPC .......... *G01S 5/0269* (2020.05); *G01S 5/0045* (2013.01); *G01S 5/0226* (2013.01); *H04B 7/1851* (2013.01)

(58) Field of Classification Search
  CPC .......... G01S 5/0269; G01S 5/02; G01S 19/28; H04B 7/1851
  USPC .................................................... 342/357.58
  See application file for complete search history.

(56) References Cited

U.S. PATENT DOCUMENTS

| | | | | |
|---|---|---|---|---|
| 6,985,105 | B1* | 1/2006 | Pitt | G01S 19/05 342/357.42 |
| 7,095,376 | B1* | 8/2006 | Timothy | H01Q 1/125 343/705 |
| 7,324,046 | B1* | 1/2008 | Wu | H01Q 1/28 342/359 |
| 8,134,511 | B2* | 3/2012 | Koh | H01Q 21/08 343/754 |
| 11,101,553 | B2* | 8/2021 | Adada | H01Q 25/00 |
| 2009/0051590 | A1* | 2/2009 | Pitt | G01S 19/05 342/357.42 |
| 2018/0088242 | A1* | 3/2018 | Eagling | G01S 19/05 |
| 2019/0004144 | A1* | 1/2019 | O'Shea | G01S 5/02 |
| 2020/0259250 | A1* | 8/2020 | Diamond | H01Q 3/08 |

* cited by examiner

*Primary Examiner* — Harry K Liu
(74) *Attorney, Agent, or Firm* — Polsinelli PC

(57) ABSTRACT

An example system can include a first antenna having a first orientation, a second antenna having a second orientation and a control system communicating with the first antenna and the second antenna. The control system performs operations which can include determining a pathway of a satellite, comparing the pathway to a first radiation pattern of the first antenna and a second radiation pattern of the second antenna, wherein the first antenna and the second antenna are each positioned such that a first keyhole of the first antenna does not overlap a second keyhole of the second antenna, to yield a comparison and selecting, based on the comparison, one of the first antenna or the second antenna to communicate with the satellite along the pathway.

20 Claims, 9 Drawing Sheets

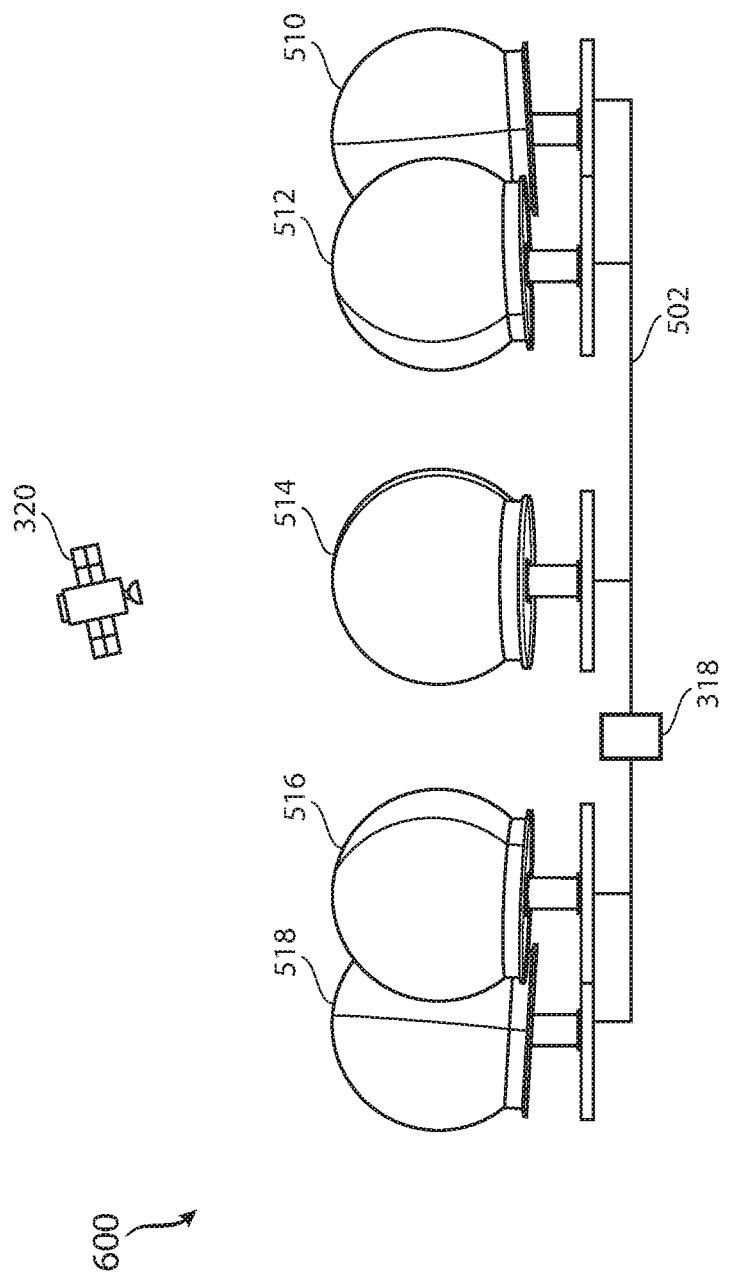

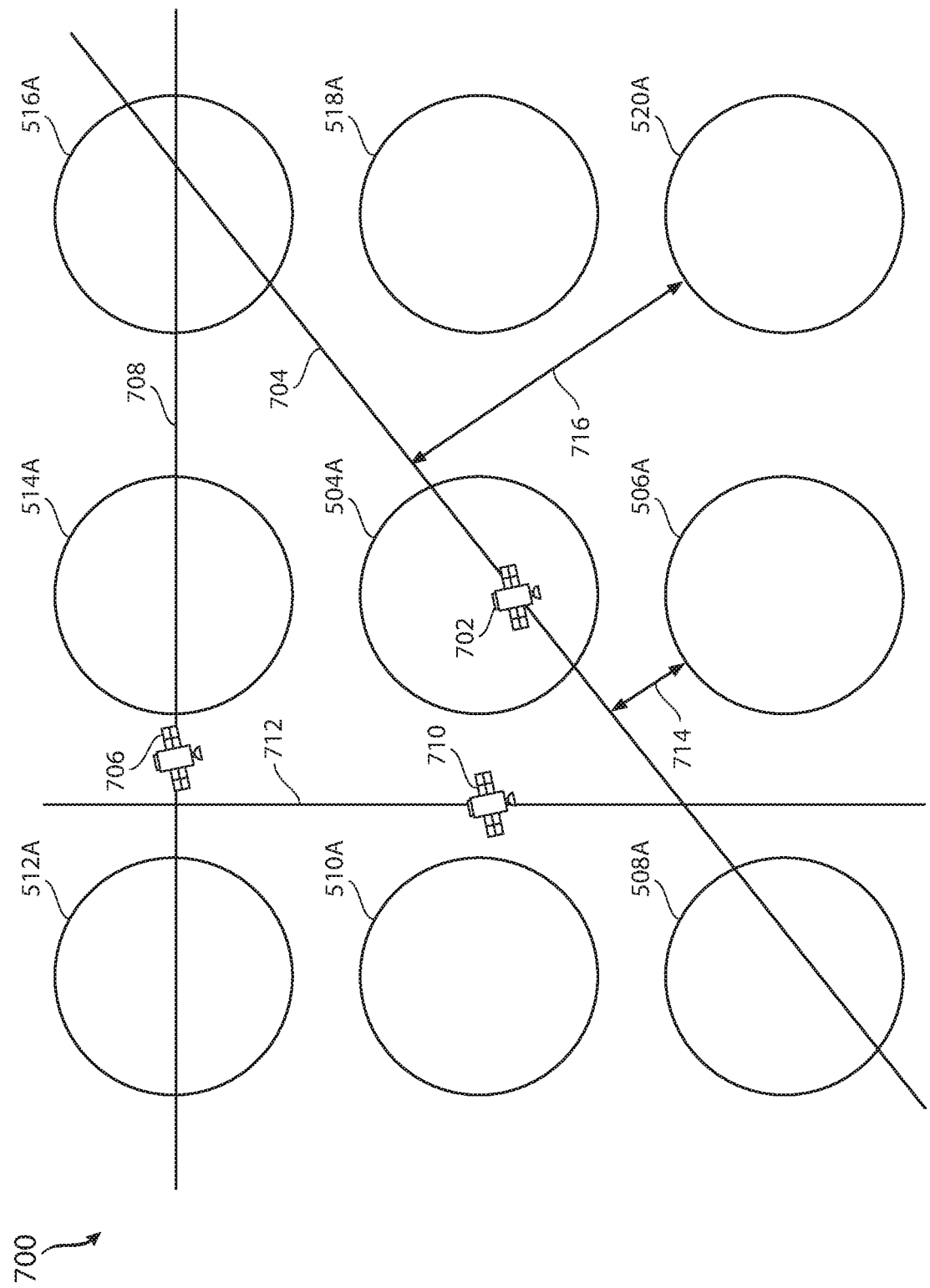

SYSTEM AND METHOD OF PROVIDING MULTIPLE ANTENNAS TO TRACK SATELLITE MOVEMENT

TECHNICAL FIELD

This disclosure introduces an approach to deploying a group of antennas to track a satellite as it moves in a manner to address the keyhole problem for each antenna.

BACKGROUND

Satellite communication enables direct communication between a single satellite and a gateway system on earth. The gateway system has a point-to-point or one-to-one communication framework for transmitting and receiving signals with the satellite and is typically used to enable user terminals that are communicating separately with the satellite to gain access to the Internet or other networks. The gateway is a ground station that transmits data to/from the satellite and communicates with a separate network like the Internet. The gateway houses antennas and equipment that convert Radio Frequency (RF) signals to an Internet Protocol (IP) signal for terrestrial connectivity.

The keyhole problem in the context of a gateway refers to the difficulty that antenna systems encounter as they communicate with a satellite as it crosses a zenith position or the point directly above the antenna. The keyhole problem can be addressed through the use of a gimbal on an antenna to physical move the antenna and thus the position of the keyhole. A gimbal is a pivoted support configured with the antenna that allows for the rotation of the antenna about an axis. Two-axis gimbals can be deployed as well.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 6 illustrates a side view of a 3×3 grid of antennas each one positioned or tilted to address the keyhole problem;

FIG. 7 illustrates a satellite movement across the sky showing keyhole regions;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Overview

Figure 1:
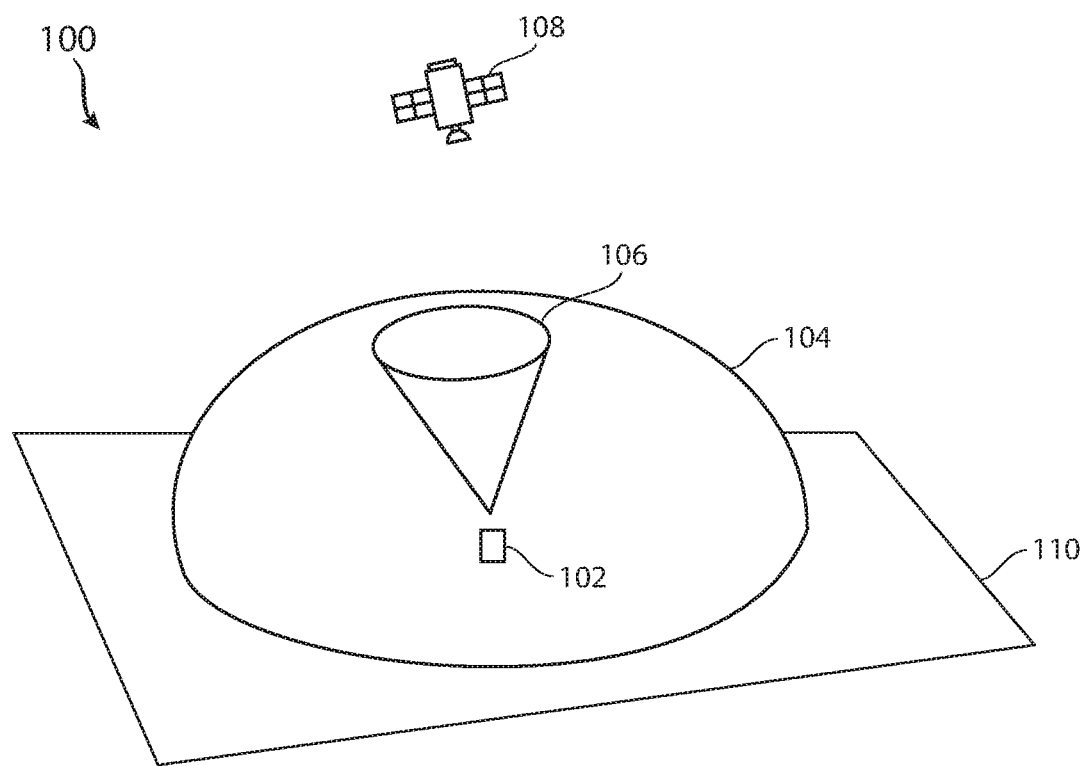
FIG. 1 illustrates the keyhole problem for an antenna communicating with a satellite.

FIG. 1 illustrates the keyhole problem. The system 100 of FIG. 1 shows an antenna 102 as part of a gateway on a ground plane 110. A radiation pattern 104 of the antenna 102 is shown. The antenna 102 communicates with a satellite 108. The radiation pattern 104 includes a "keyhole" 106 or a blind region where the antenna is unable to communicate with the satellite 108.

Several prior approaches for eliminating a keyhole problem are associated with an azimuth-elevation gimbal antenna. In one solution, the azimuth motor of the gimbal antenna turns very rapidly when the satellite 108 passes through a near zenith position. The antenna can be tilted up one of the elevation axis joints when the antenna points at or near its zenith position such that the pointing angle may be altered by a predetermined angle, for example around 0.5 degrees to 1 degree, from the zenith position. A second approach involves tilting a secondary reflector of a parabolic antenna such that the pointing direction of the antenna may be altered by a predetermined angle. These approaches involve physically moving the antenna or reflectors in the antenna in the direction of the radiation pattern or beam. The equipment needed to move the antenna includes extra mechanical components that require maintenance.

The present disclosure introduces a new control system and multiple antenna framework for solving the keyhole problem described above. One advantage to the approach disclosed herein is that the antennas in the framework can be fixed at specific positions thus eliminating the need for a complicated gimbal system for physically adjusting an antenna to address the keyhole problem. Two or more antennas can be configured, each with a particular position such that a first keyhole from a first antenna does not overlap a second keyhole from a second antenna. A control system can evaluate a path of a satellite as it passes overhead and can assign one or more antennas to the respective satellite such that a keyhole is avoided. The satellite can be tracked for the entire pathway over the antennas without a loss of signal. The proposed configuration eliminates the need for the mechanical structures described above which would be required for moving or tilting an antenna to adjust the position of the keyhole to maintain communication with a satellite.

Embodiments include methods, systems, and computer-readable storage devices. The systems can include a control system for managing a plurality of antennas or a group of antennas configured and operated as disclosed herein.

An example method includes determining a pathway of a satellite and comparing the pathway to a first radiation pattern of a first antenna on earth and a second radiation pattern of a second antenna on earth. The first antenna and the second antenna are each positioned or oriented such that a first keyhole of the first antenna does not overlap a second keyhole of the second antenna. The output of the determining step can be a comparison or data describing a mapping of the radiation patterns and keyholes of respective antennas. The method includes selecting, based on the comparison, at least one of the first antenna or the second antenna to communicate with the satellite along the pathway.

The step of selecting, based on the comparison, one of the first antenna or the second antenna to communicate with the satellite along the pathway further can include selecting the first antenna. The first antenna can be selected based on the comparison determining that the pathway of the satellite will avoid the first keyhole of the first antenna. Additional antennas can be organized in group as well in configurations such as a 3×3 matrix, a linear arrangement of two or more antennas, or other configurations. In some cases, the configuration can be driven by the space available for the group of antennas, government regulation, terrain, cost, volume of satellites needing coverage, or other factors.

In one aspect, the first antenna can be oriented at a first tilt and the second antenna can be oriented at a second tilt such that the first keyhole and the second keyhole do not overlap. The first tilt can be the same as the second tilt or the first antenna and the second antenna can be tilted in different directions. In one aspect, the first antenna and the second antenna are each oriented in a non-vertical direction such that the first keyhole and the second keyhole do not overlap. In another example, one of the antennas could be configured in a vertical direction while the other antenna is configured with a tilt.

An example system can include a first antenna having a first orientation, a second antenna having a second orientation and a control system communicating with the first antenna and the second antenna. The control system performs operations which can include determining a pathway of a satellite and comparing the pathway to a first radiation pattern of the first antenna and a second radiation pattern of the second antenna. The first antenna and the second antenna can each be positioned or oriented such that a first keyhole of the first antenna does not overlap a second keyhole of the second antenna. An output of the analysis can be a comparison or other resulting data. The system can select, based on the comparison, one of the first antenna or the second antenna to communicate with the satellite along the pathway.

In another aspect, a system can include a processor and a computer-readable storage device storing instructions which, when executed by the processor, causes the processor to perform operations. The system can be a control system in communication with two or more antennas configured as described herein with orientations that do not cause respective keyholes to overlap. In another aspect, the system can include the control system and two or more antennas.

The system can cause the processor to perform operations including determining a pathway of a satellite and comparing the pathway to a first radiation pattern of a first antenna on earth and a second radiation pattern of a second antenna on earth. The first antenna and the second antenna can each be positioned or oriented such that a first keyhole of the first antenna does not overlap a second keyhole of the second antenna. Based on the comparison, one of the first antenna or the second antenna can be selected or assigned to communicate with the satellite along the pathway. The system can include more than two antennas as well.

This disclosure now provides more detail regarding new structures and methods for resolving the keyhole problem in satellite-to-gateway communications. As noted above, the current solutions focus on mechanically adjusting an antenna in order to physically move the region of the keyhole such that communication between the antenna and the satellite can be maintained. The mechanical solution introduces complexity into the antenna and supporting structure including mechanical control systems requiring maintenance in the field. This disclosure introduces a new approach of configuring two or more antennas each configured at a chosen angle or orientation of tilt or at least one configured with a tilt. Each antenna is also in communication with the control system. A path of the satellite to be tracked is identified and the control system selects one or more of the antennas to communicate with the satellite. An antenna with a keyhole not in the path of the satellite can be chosen such that no communication loss will occur as the satellite passes overhead. The two or more antennas can be configured at a single location and the control system can assign one of the antennas to communicate with a respective satellite as it passes overhead.

In another aspect, the control system, in order to avoid a keyhole, can cause one antenna to track the satellite for a portion of a pass across the sky and another antenna to complete the tracking of the satellite across the sky. This approach may be used where load balancing is needed or where an antenna is not operable at a certain time, or for other reasons. In this regard, for a given pass of a satellite overhead, the control system can establish a schedule of the antennas that are to track the satellite and the schedule can switch between antennas at different times.

The system can also include a particular configuration of a plurality of antennas such as five antennas in a linear configuration, a circular arrangement of a plurality of antennas, or a 3×3 matrix of antennas, each with a particular tilt. Other configurations can be used as well, including configurations that are asymmetric. Generally, the different embodiments disclosed herein can include two or more antennas, with different orientations, and a control system that assigns at least one antenna to track a satellite to avoid the keyhole problem. The term "tilt" can mean the orientation of an antenna is at least to some degree off from a zenith position or an orientation straight up. However, as is noted herein, in one example configuration, one antenna could be oriented at a zenith or vertical direction and one or more other antennas can have a tilt which orients them to be different from a zenith or vertical direction.

In another example, a group of antennas can be configured linearly, in rows, staggered, or in another configuration with at least two antennas of the group having a different orientation. The antennas can also be configured at one or more different elevations in the group of antennas. For example, in order to obtain the proper mapping in the sky of keyhole locations, one antennas might be positioned at a higher elevation than another antenna in the group. Thus, the elevation of one or more antennas in the group can be adjusted or chosen based at least in part on one or more of the terrain, the desired orientation and positioning of the antenna and its keyhole, a number of antennas in the group, or other factors.

In one example, to achieve the ability to deal with the keyhole problem, a threshold number of antennas can be deployed. For example, the threshold may be three, five or seven antennas. Other numbers can be chosen as well. The group of antennas can include any two or more antennas to make up the group. The threshold number of antennas can also be determined by the desired mapping in the sky of keyholes in connection with a number of satellites that need to be serviced. In one example, the group of antennas (in a linear group, two or more rows, or other configuration) can include nine antennas. Other parameters can be also used to identify or determine the threshold number or a desired number of antennas as well as the group configuration as disclosed herein. For example, one or more parameters that can be used to determine how many antennas to deploy can include a throughput requirement, a quality of service requirement, redundancy, predicted data traffic, and so forth.

In yet another example, the respective tilt for each antenna in a group can be established independent of the particular arrangement of the group. For example, a group of nine antennas can have the respective tilt of each antenna determined as described herein, and then the grouping can be configured in a 3×3 matrix, or in a linear pattern, or in rows, a box shape, or some other configuration. The satellite in communication with the group of antennas can be 500 km away and thus the particular configuration on the earth may not change the mapping in the sky of the keyholes substantially.

Figure 2:
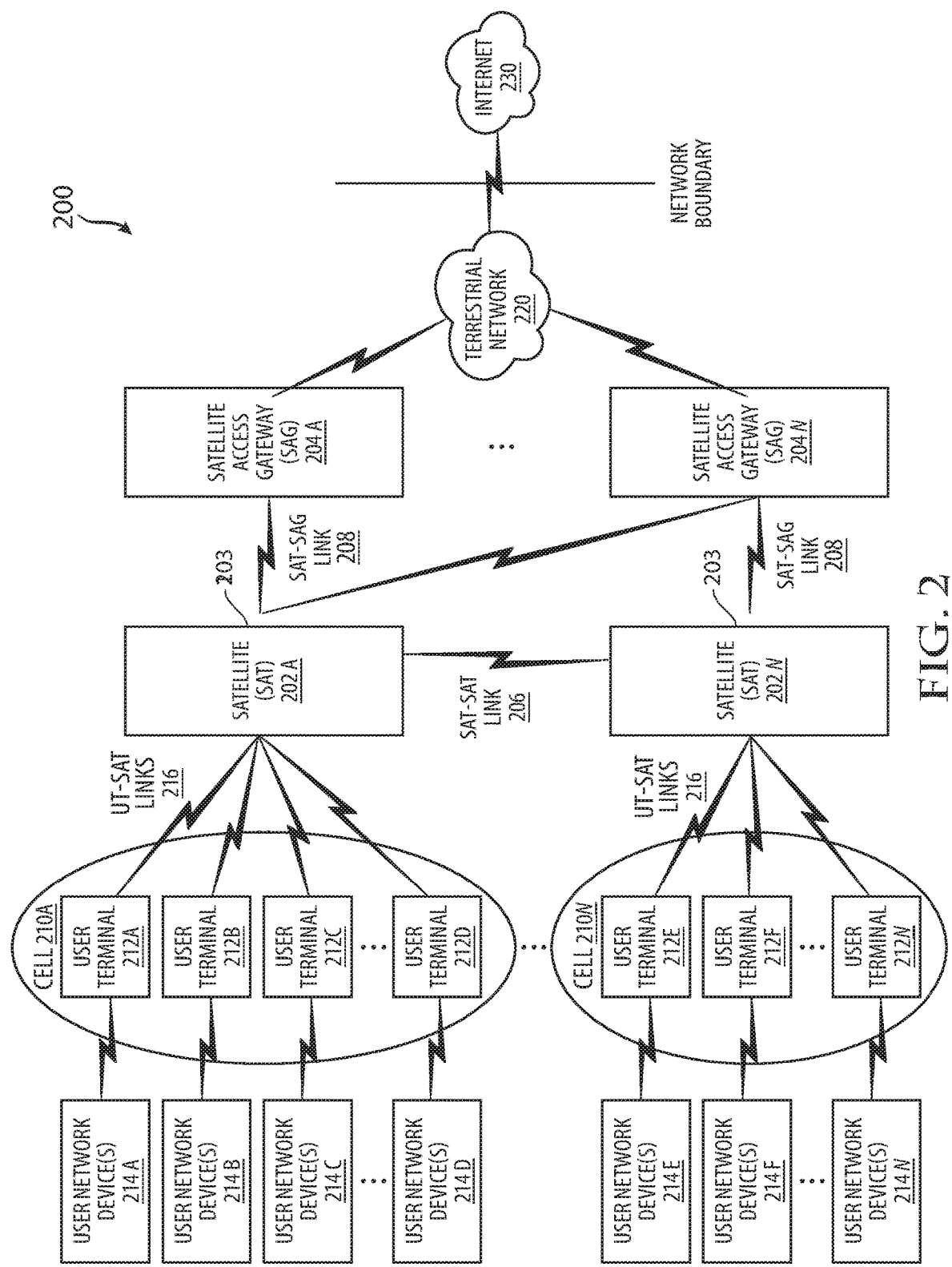
FIG. 2 illustrates a satellite in communication with various user terminals and a gateway.
Figure 8A:
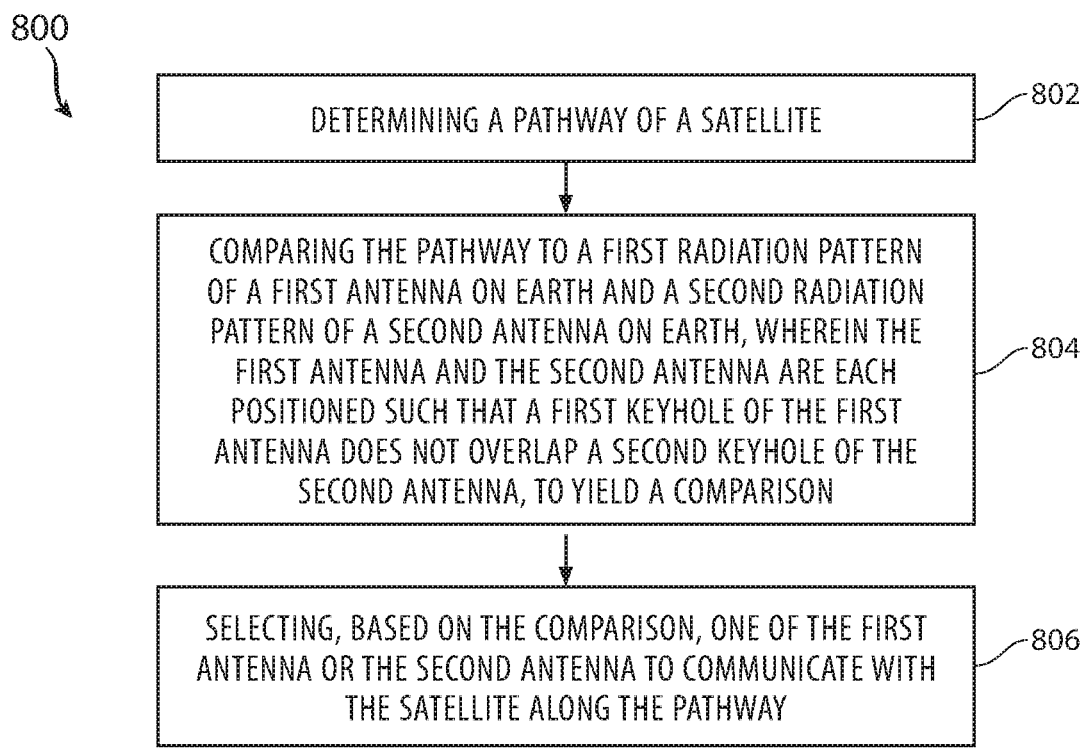
FIG. 8A illustrates a method embodiment addressing the keyhole problem using multiple antennas.
Figure 8B:
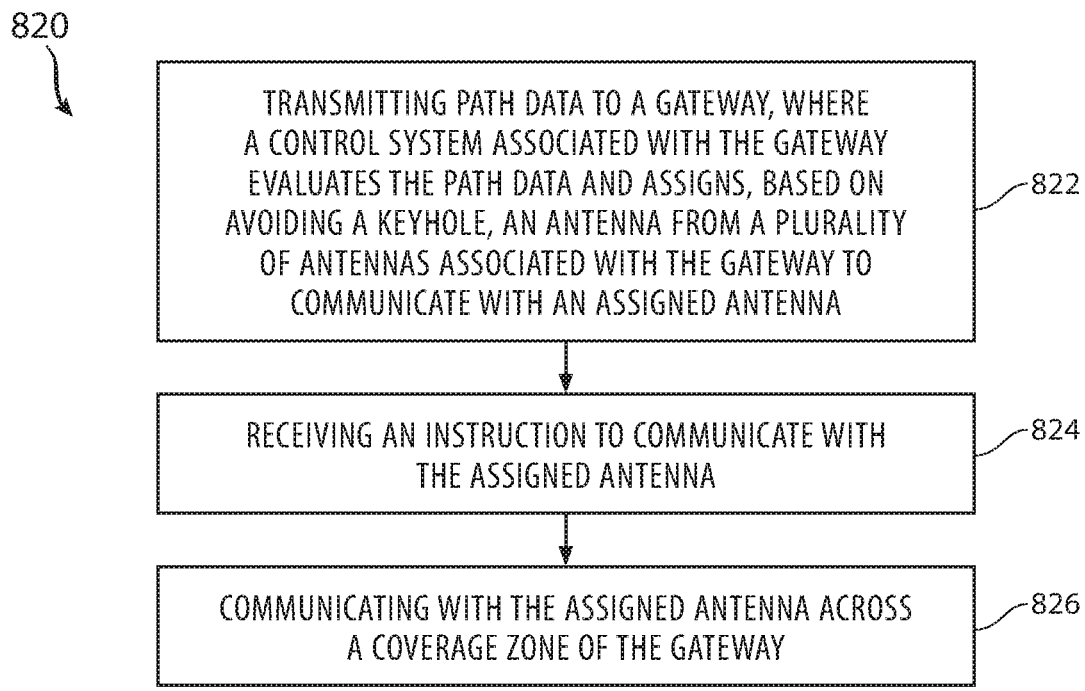
FIG. 8B illustrates another method embodiment addressing the keyhole problem using multiple antennas.
Figure 9:
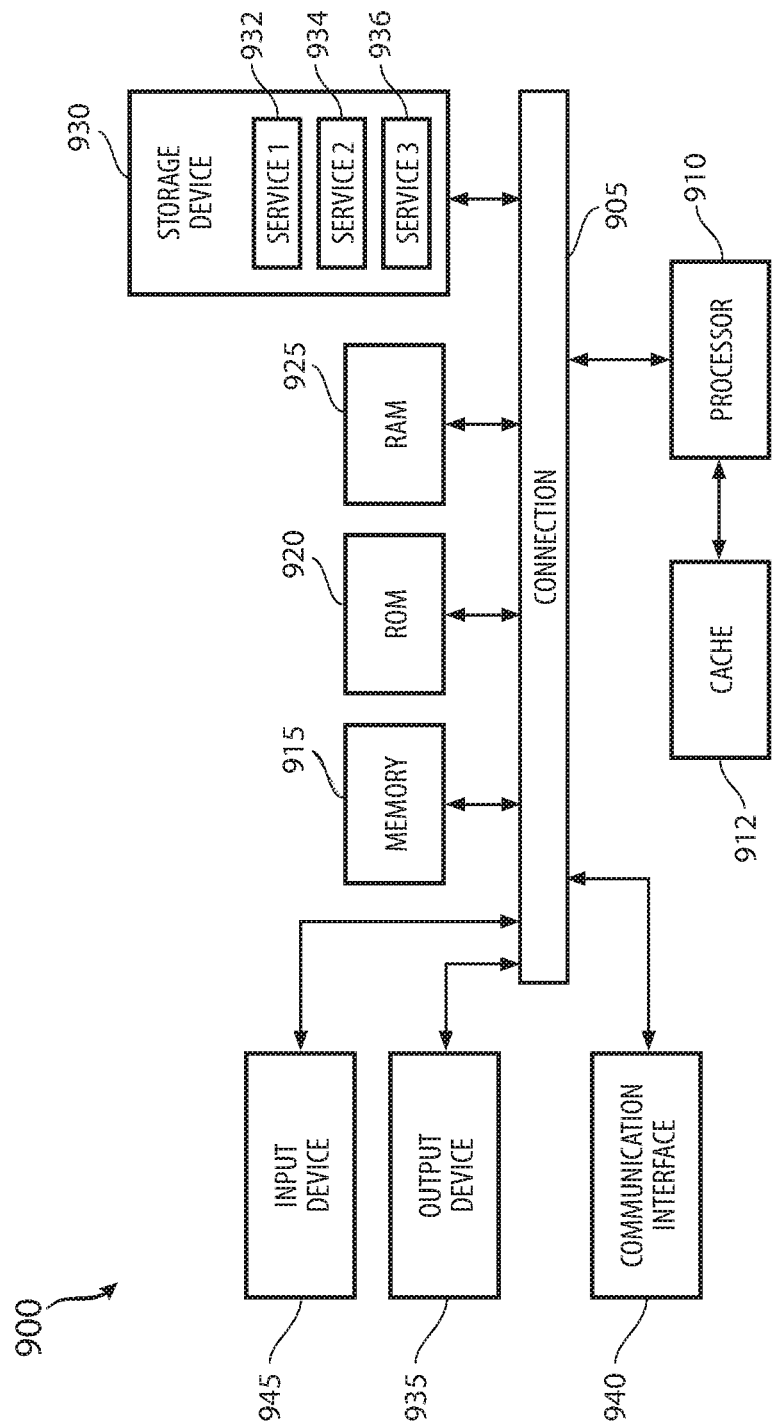
FIG. 9 illustrates an example computing device architecture, in accordance with some examples of the present disclosure.

The present technologies will be described in the disclosure as follows. FIG. 1 was introduced above and identifies the fundamental keyhole problem with respect to the radiation pattern of an antenna. The discussion begins with a description of example systems and technologies for wireless communications and multi-user communication with a satellite-to-gateway system, as illustrated in FIG. 2. FIGS. 3-7 illustrate various aspects of multi-antenna configurations with different tilts for the antennas and a control system to address the keyhole problem. FIGS. 8A and 8B illustrate different method embodiments. FIG. 9 illustrates computer components that can be used by any device disclosed herein. The disclosure now turns to FIG. 2 to describe the new antenna system for resolving the keyhole problem.

FIG. 2 is a block diagram illustrating an example wireless communication system 200, in accordance with some examples of the present disclosure. In this example, the wireless communication system 200 includes one or more satellites (SATs) 202A through 202N (collectively "202"), one or more satellite access gateways (SAGs) 204A through 204N (collectively "204"), user terminals (UTs) 212A through 212N (collectively "212"), user network devices 214A through 214N (collectively "214"), and a terrestrial network 220 in communication with the Internet 230. As noted above, this disclosure provides different link adaptation algorithms for satellite-to-user-terminal communications as well as satellite-to-gateway communications.

The SATs 202A-N can include orbital communications satellites capable of communicating with other wireless devices or networks (e.g., 204, 212, 214, 220, 230) via radio telecommunications signals. The SATs 202 can provide communication channels, such as radio frequency (RF) links (e.g., 206, 208, 216), between the SATs 202 and other wireless devices located a different locations on Earth and/or in orbit. In some examples, the SATs 202A-N can establish communication channels for Internet, radio, television, telephone, radio, military, and/or other applications.

The user terminals 212 can include any electronic devices and/or physical equipment that support RF communications to and from the SATs 202. Similarly, the SAGs 204 can include gateways or earth stations that support RF communications to and from the SATs 202. The user terminals 212 and the SAGs 204 can include antennas for wirelessly communicating with the SATs 202. The user terminals 212 and the SAGs 204 can also include satellite modems for modulating and demodulating radio waves used to communicate with the SATs 202. In some examples, the user terminals 212 and/or the SAGs 204 can include one or more server computers, routers, ground receivers, earth stations, computer equipment, antenna systems, and/or any suitable device or equipment. In some cases, the user terminals 212 and/or the SAGS 204 can perform phased-array beamforming and digital-processing to support highly directive, steered antenna beams that track the SATs 202. Moreover, the user terminals 212 and/or the SAGs 204 can use one or more frequency bands to communicate with the SATs 202, such as the Ku and/or Ka frequency bands. Other frequency bands can be used as well.

The user terminals 212 can be used to connect the user network devices 214 to the SATs 202 and ultimately the Internet 230. The SAGs 204 can be used to connect the terrestrial network 220 and the Internet 230 to the SATs 202. For example, the SAGs 204 can relay communications from the terrestrial network 220 and/or the Internet 230 to the SATs 202, and communications from the SATs 202 (e.g., communications originating from the user network devices 214, the user terminals 212, or the SATs 202) to the terrestrial network 220 and/or the Internet 230.

The user network devices 214 can include any electronic devices with networking capabilities and/or any combination of electronic devices such as a computer network. For example, the user network devices 214 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, etc. The terrestrial network 220 can include one or more networks and/or data centers. For example, the terrestrial network 220 can include a public cloud, a private cloud, a hybrid cloud, an enterprise network, a service provider network, an on-premises network, and/or any other network.

In some cases, the SATs 202 can establish RF links 216 between the SATs 202 and the user terminals 212. The RF links 216 can provide communication channels between the SATs 202 and the user terminals 212. In some examples, the user terminals 212 can be interconnected (e.g., via wired and/or wireless connections) with the user network devices 214A. Thus, the RF links 216 between the SATs 202 and the user terminals 212 can enable communications between the user network devices 214A and the SATs 202. In some examples, each SAT 202A through 202N can serve user terminals 212 distributed across one or more cells 210A through 210N (collectively "210"). The cells 210 can represent land areas served and/or covered by the SATs 202. For example, each cell can represent the satellite footprint of radio beams propagated by a SAT. In some cases, a SAT can cover a single cell. In other cases, a SAT can cover multiple cells. In some examples, a plurality of SATs 202 can be in operation simultaneously at any point in time (also referred to as a satellite constellation). Moreover, different SATs can serve different cells and sets of user terminals.

The SATs 202 can also establish RF links 206 with each other to support inter-satellite communications. Moreover, the SATs 202 can establish RF links 208 with the SAGs 204. In some cases, the RF links 216 between the SATs 202 and the user terminals 212 and the RF links between the SATs 202 and the SAGs 204 can allow the SAGs 204 and the user terminals 212 to establish a communication channel between the user network devices 214, the terrestrial network 220 and ultimately the Internet 230. For example, the user terminals 212 can connect the user network devices 214 to the SATs 202 through the RF links 216 between the SATs 202 and the user terminals 212. The SAGS 204 can connect the SATs 202 to the terrestrial network 220, which can connect the SAGs to the Internet 230. Thus, the RF links 208 and 216, the SATs 202, the SAGs 204, the user terminals 212 and the terrestrial network 220 can allow the user network devices 214 to connect to the Internet 230.

In some examples, a user can initiate an Internet connection and/or communication through a user network device from the user network devices 214. The user network device can have a network connection to a user terminal from the user terminals 212, which it can use to establish an uplink (UL) pathway to the Internet 230. The user terminal can wirelessly communicate with a particular SAT from the SATs 202, and the particular SAT can wirelessly communicate with a particular SAG from the SAGS 204. The particular SAG can be in communication (e.g., wired and/or wireless) with the terrestrial network 220 and, by extension, the Internet 230. Thus, the particular SAG can enable the Internet connection and/or communication from the user network device to the terrestrial network 220 and, by extension, the Internet 230.

In some cases, the particular SAT and SAG can be selected based on signal strength, line of sight, and the like. If a SAG is not immediately available to receive communications from the particular SAT, the particular SAT can be configured to communicate with another SAT. The second SAT can in turn continue the communication pathway to a particular SAG. Once data from the Internet 230 is obtained for the user network device, the communication pathway can be reversed using the same or different SAT and/or SAG as used in the UL pathway. The pathways described herein for enabling a user terminal to access the Internet through a SAT and SAG can be chosen based on the adaptation algorithms disclosed herein.

In some examples, the RF links 206, 208, and 216 in the wireless communication system 200 can operate using orthogonal frequency division multiple access (OFDMA) via both time domain and frequency domain multiplexing. OFDM, also known as multicarrier modulation, transmits data over a bank of orthogonal subcarriers harmonically related by the fundamental carrier frequency. An example configuration of an OFDM radio frame that can be used for communications in the wireless communication system 200 is shown in FIG. 2 and described below with respect to FIG. 2. Moreover, in some cases, for computational efficiency, fast Fourier transforms (FFT) can be used for modulation and demodulation.

While the wireless communication system 200 is shown to include certain elements and components, one of ordinary skill will appreciate that the wireless communication system 200 can include more or fewer elements and components than those shown in FIG. 2. For example, the wireless communication system 200 can include, in some instances, networks, cellular towers, communication hops or pathways, network equipment, and/or other electronic devices that are not shown in FIG. 2.

Figure 3:
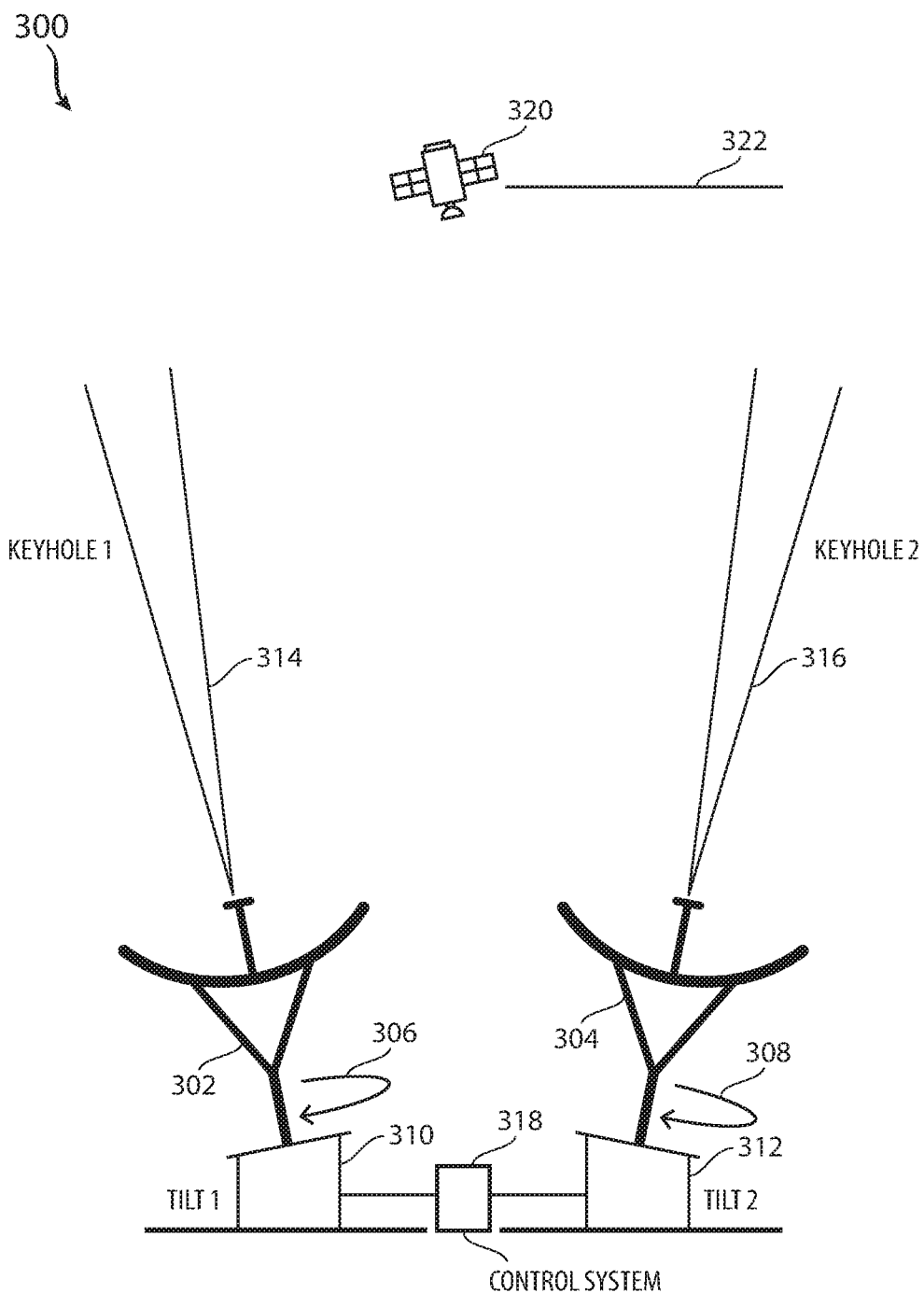
FIG. 3 illustrates two antennas each having a respective tilt in order to position the respective keyholes for each antenna at a certain location.

FIG. 3 illustrates an example system or gateway and satellite 300 according to the principles disclosed herein. An example system or gateway and satellite 300 can include a first antenna 302 having a first orientation or tilt 306. A first antenna control system 310 can include the various electrical components for communicating signals to and from the antenna as are known in the art. A second antenna 304 can have a second orientation or tilt 308. A second antenna control system 312 can be configured with the second antenna 304. As noted above, generally the principles disclosed herein are that the orientations 306, 308 are established for the different antennas 302, 304 such that their keyholes do not overlap. One antenna could be vertical while another is at a tilt. The particular angles of the respective antennas is not relevant as long as their respective keyhole regions do not overlap fully. In one aspect, the regions could overlap partially.

A centralized control system 318 communicates with the first antenna 302 and the second antenna 304 through their respective antenna control systems 310, 312. Data received at respective antennas 302, 304 and data transmitted by the respective antennas can be communicated to and from the control system 318 through the respective antenna control systems 310, 312.

The control system 318 can perform operations that can include determining a pathway 322 of a satellite 320 and comparing the pathway 322 to a first radiation pattern or first keyhole 314 of the first antenna 302 and a second radiation pattern or second keyhole 316 of the second antenna 304. The first antenna 302 and the second antenna 304 are each positioned or oriented such that a first keyhole 314 of the first antenna 302 does not fully overlap a second keyhole 316 of the second antenna 304. A result of the comparing step is data which can be termed a comparison. The system or gateway 300 can select, based on the comparison, one of the first antenna 302 or the second antenna 304, or both, to communicate with the satellite 320 along the pathway 322. In one example, the first antenna 302 may be assigned to track the satellite 320 along part of the pathway 322 and the second antenna 304 may be assigned to track the satellite 320 through a different party of the pathway 322.

FIG. 3 shows the satellite 320 with its path 322 through the sky. The path 322 can represent the pathway that the satellite will travel as it moves in space over a region serviced by the antennas 302, 304.

The control system 318 is shown as being in communication with the first antenna control system 310 and the second antenna control system 312. The control system 318 can receive data from the respective antennas 302, 304 such that the control system 318 can identify respective satellite 320 coming within its coverage region and such that it can identify or predict a pathway 322 associated with the satellite 320. The particular mechanism by which the control system 318 will identify the path 322 for the satellite 320 can vary. For example, the control system 318 can receive data from another remote control system (not shown) associated with a satellite or antenna. The remote control system can perform an analysis of the satellite 320 moving from one position to another in a region outside of the coverage zone of antennas 302, 304 such that the control system 318 has knowledge of the movement of the satellite 320 and its predicted or expected path 322 as it enters the coverage zone of the antennas 302, 304.

One of the antennas 304 can initially communicate with the satellite 320 as its path 322 enters a coverage area. Then, having identified the satellite 320, the control system 318 can evaluate its path or receive data from the satellite 320 about its path, and assign the same antenna 304 to track the satellite 320 or consider and assign another antenna 302 for tracking. A tracking patterns or schedule could also be established for the path which could include a timeframe or satellite location for tracking a portion of the path 322 at one antenna, and then switching to another antenna at a different time or location of the satellite 320 along the path.

In one example, the path 322 of the satellite is known or stored already at the control system 318. In this case, the system uses the stored path data to determine or assign which antenna should communicate with the satellite. As various satellite can pass overhead each day and on a scheduled or expected pattern, the control system 318 can ultimately establish a schedule of antennas and which satellites they are assigned to as various satellite pass overhead.

The control system 318 can include data regarding the configuration of the first keyhole 314 and the second keyhole 316. The control system 318 can implement an algorithm, method, or module according to program instructions stored in a computer-readable storage device that can cause operations to be performed in which the path 322 of the satellite 320 can be evaluated in the context of the physical configuration of the first keyhole 314 and the second keyhole 316. The control system 318 can determine whether the path 322 will pass through one of the regions defined by the first and second keyholes 314, 316. The output of the operation can include a determination or comparison that identifies a preferred path 322 or a selected path 322 which will enable uninterrupted communication as the satellite 320 passes over the region covered by the antennas 302, 304. For example, if the path 322 is expected to pass through the region covered by keyhole 314 of antenna 302, then the control system 318 can assign the antenna 304 to communicate with the satellite 320 as it passes through the keyhole 314 of antenna 302.

The control system 318 can establish a schedule for the satellite 320 that can include one or more antennas assigned to track the satellite 320 along its path 322. The benefit of this approach is that there is no need to physically move or adjust the antennas 302 after they are orientated, 304 to address the keyhole issue. In one aspect, the tilt 306, 308 of the respective antennas can be fixed such that no mechanical structure is needed for a control system to physically move or reorient either of the antennas 302, 304.

In another aspect, the one or more antennas 302, 304 can alternatively be configured with a gimbal for one or two axis adjustments or movements. Such movements can be for initial orientation or for tracking a satellite 320 and may or may not be for moving the antenna in order to address the keyhole problem during communication. In this scenario, the analysis performed by the control system 318 with respect to the path 322 of the satellite 320 can take into account the capability of the antennas 302, 304 to pivot on their respective axis, which would cause a movement in their respective keyholes 314, 316. Thus, any movement of the antennas 302, 304 as they track a satellite 320 can be considered by the control system 318 when selecting which antenna to choose such that the path 322 of the satellite 320 does not encounter a keyhole as it passes overhead.

Where an antenna schedule is generated for the satellite 320, the schedule can include moving one or more antennas 302, 304 when that capability exists. For example, a first antenna 304 may be assigned to track the satellite 320 for 5 minutes and then prior to a handover to antenna 302, antenna 302 may be physically adjusted to be at a tilt chosen for this particular schedule for tracking the satellite 320.

In another aspect, the control system 318 can first identify a satellite 320 as it enters into the coverage zone for the group of antennas 302, 304. Data regarding the motion of the satellite 320 can be evaluated by the control system 318 in order to predict or identify the path 322 through the coverage zone. Thus, the evaluation that is performed by the control system 318 can relate to a predicted path 322, a calculated path 322 or a known path based on a previous data, reported data, or historical data regarding the movement of the satellite 320.

In another aspect, a control system 318 or system can include a processor and a computer-readable storage device storing instructions which, when executed by the processor, cause the processor to perform operations. The system can be the control system 318 in communication with two or more antennas 302, 304 configured as described herein with orientations that do not cause respective keyholes 314, 316 to overlap. The system can cause the processor to perform operations including one or more of determining a pathway of a satellite and comparing or evaluating the pathway of the satellite to a first radiation pattern of a first antenna on earth and a second radiation pattern of a second antenna on earth. The first antenna 302 and the second antenna 304 can each be positioned or oriented such that a first keyhole 314 of the first antenna 302 does not overlap a second keyhole 316 of the second antenna 304. The output of the processing can yield a comparison, an evaluation, or a result. The control system 318 can then select, based on the comparison, one of the first antenna 302 or the second antenna 304 to communicate with the satellite 320 along the pathway 322.

In another aspect, the system can include a first antenna 302 having a first orientation 306, a second antenna 304 having a second orientation 308 and a control system 318 communicating with the first antenna 302 and the second antenna 304. The control system 318 can perform one or more operations to manage the assignment or scheduling of antennas to track a satellite 320 in its path 322. The operations can include determining a pathway of a satellite 320 and comparing the pathway to a first radiation pattern 314 of the first antenna 302 and a second radiation pattern 316 of the second antenna 304. The first antenna 302 and the second antenna 304 can each be positioned or oriented such that a first keyhole 314 of the first antenna 302 does not overlap a second keyhole 316 of the second antenna 304. The output of the processing can be a comparison or a result of an evaluation or even a machine learning algorithm. The control system 318 then can perform the operation of selecting or scheduling, based on the comparison, one of the first antenna 302 and/or the second antenna 304 to communicate with the satellite 320 along the pathway 322. More antennas can also be part of the antenna framework at a gateway.

Figure 4:
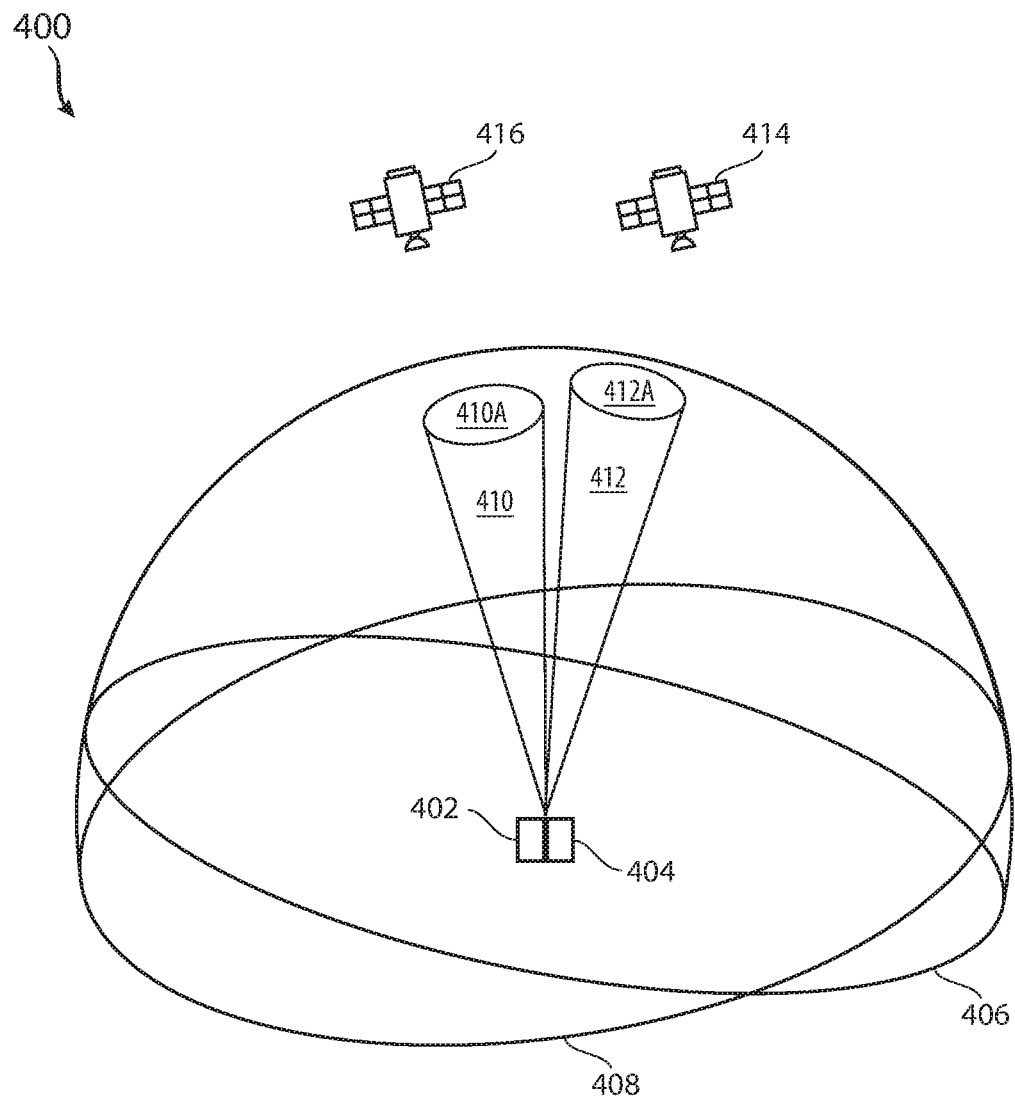
FIG. 4 illustrate overlapping radiation patterns for two tilted antennas including the respective keyhole for each antenna.

FIG. 4 illustrates two overlapping radiation patterns 400. The first and second antennas 402 and 404 are located close to each other. Therefore, from the perspective of a satellite hundreds of kilometers away, they appear as if they are overlapping. A first antenna 402 produces a first radiation pattern 406. A keyhole 412 is illustrated as part of the radiation pattern 406. A region 412A is shown as the area in which satellite 414 would not be able to communicate with antenna 402. Antenna 402 is configured at a tilt angle such that it is not configured vertically. Antenna 402 could also be configured vertically in another aspect.

A second antenna 404 is shown with its radiation pattern 408. A keyhole 410 is shown as part of the radiation pattern for the antenna 404. A region 410A is illustrated as part of the keyhole 410 in which the satellite 416, because it is in the blind spot for keyhole region 410A, would not be able to communicate with antenna 404. Antenna 404 is also configured or oriented at a tilt such that it is not configured in a vertical position. In another aspect, one of antennas 402 and 404 can be configured in a vertical direction while the other antennas are not configured at the vertical direction such that the respective keyholes 410, 412 do not overlap.

The tilt angle that is used herein does not need to be the same for each antenna. The tile might be at, for example, 80 degrees from a horizontal plane or could be anywhere in a range from 60 degrees to 89.5 degrees, inclusive. One antenna could be vertical at 90 degrees as well. In another example, the system might include two or more antennas in a variety of configurations.

Figure 5:
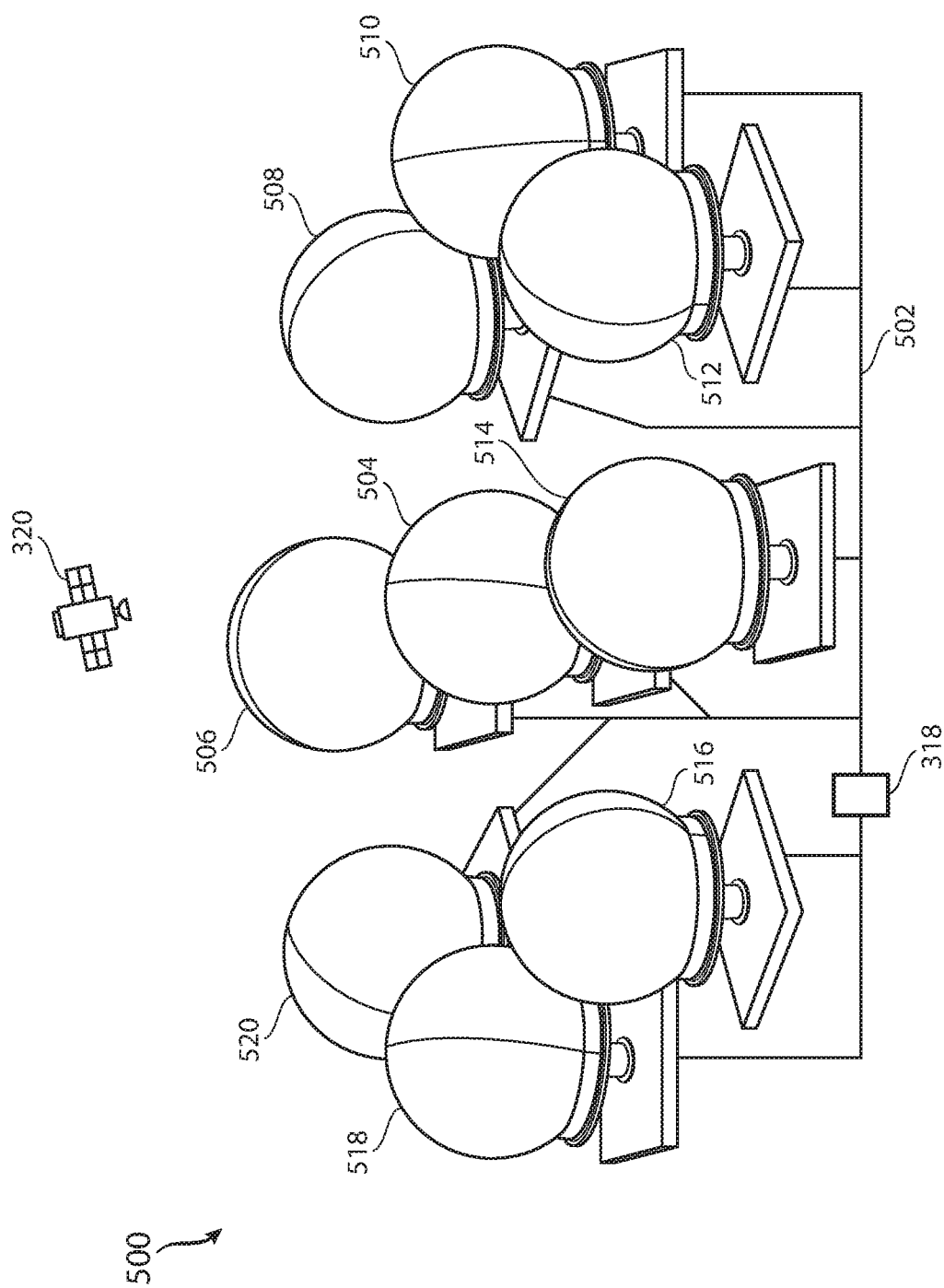
FIG. 5 illustrates a 3×3 grid of antennas each one positioned or tilted to address the keyhole problem.

For example, FIG. 5 illustrates a 3×3 array or grid 500 of antennas. A control system 318 can be in communication 502 with each antenna of a group of antennas (504, 506, 508, 510, 512, 514, 516, 518, 520) using wired or wireless communication. A central antenna 504 is shown which can be configured at a tilt or also could be arranged in a vertical direction. In this example arrangement, antennas (506, 508, 510, 512, 514, 516, 518, 520) surround the central antenna 504 and each can be tilted inwardly towards the central antenna 504.

In the configuration of FIG. 5, several variations are contemplated. For example, in one aspect, each of the surrounding antennas (506, 508, 510, 512, 514, 516, 518, 520) to the central antenna 504 can have the same tilt angle but a different orientation towards the central antenna 504. In another aspect, the different antennas (506, 508, 510, 512, 514, 516, 518, 520) can have different tilt angles or different orientations. A different tilt angle and/or orientation or direction of each respective antenna (504, 506, 508, 510, 512, 514, 516, 518, 520) can result in a different keyhole map in the sky which will be introduced in more detail in FIG. 7.

The control system 318 used for the group of antennas in FIG. 5 has more data to evaluate than a two-antenna configuration. A respective keyhole configuration for each respective antenna (504, 506, 508, 510, 512, 514, 516, 518, 520) can be positioned in a keyhole map such that the evaluation of a satellite path 322 through such a keyhole map is more complicated as there are nine keyholes to navigate and the control system 318 has nine antennas from which to choose for assigning or scheduling the tracking responsibility for the satellite 320. The use of nine antennas is exemplary only and other configurations and numbers of antennas can vary.

FIG. 6 illustrates a side view 600 of the antenna structure 500 from FIG. 5. Antennas (510, 512, 514, 516, 518) are shown from the side view with tilts being shown for the respective antennas (510, 512, 516, 518). The control system 318 is shown in communication with each antenna (510, 512, 514, 516, 518). While FIG. 5 and FIG. 6 illustrate a 3×3 array of antennas (504, 506, 508, 510, 512, 514, 516, 518, 520), such configuration is not meant to be limiting. The antenna structure can include two or more antennas organized or grouped in any manner. For example, antenna structure and the system can include five antennas in a linear configuration, square, rectangular, circular or other configuration. In any such configuration, one antenna can have a first tilt and the remaining antenna or antennas can have a second tilt. The antenna structure itself may be the same for each antenna in the group or it may be different. Antennas may be of different sizes and have different radiation patterns as well. The principles disclosed herein apply to any antenna configuration.

In one example, one or more of the antennas (504, 506, 508, 510, 512, 514, 516, 518, 520) can have a gimbal structure for adjusting its orientation. The control system 318 can also have data regarding one or more satellites 320 as they pass overhead. The control system 318 can establish an antenna assignment schedule based on one or more of the following parameters for managing the keyhole program: time, location of respective satellites, historical data, adjustment of a respective antenna position, groupings of satellites and respective satellite movement paths, bandwidth, predicted data load, weather conditions, user terminal data, which antennas has an ability to move or adjust, current events which can impact data usage, other predicted events, and so forth. For example, for a group of 5 satellites moving overhead, a coordinated schedule of assigned antennas for certain times and a movement of one or more antennas at certain times can be determined by the control system 318 based on one or more of the parameters described above.

FIG. 7 illustrates a keyhole map 700 showing an example of a region in space where satellites 702, 706, 710 travel in respective paths 704, 708, 712 that can cross over the blind spots or keyhole areas for respective antennas. For example, keyhole region 512A can be part of the radiation pattern from antenna 512 in FIG. 5. Similarly, respective keyhole regions 504A, 516A, 510A, 504A, 518A, 508A, 506A, 520A can correspond to respective antennas 504, 516, 510, 504, 518, 508, 506, 520.

In the example shown in FIG. 7, satellite 702 is shown with a path 704 through keyhole regions 516A, 504A, and 508A. In one example, the control system 318 can utilize the information about the path 704 and can select or assign antenna 506 to track the satellite 702 because path 704 does not pass through the keyhole 506A for antenna 506. The control system 318 could also select or schedule any other antenna or antennas with respective keyhole which avoid the path 704. The selection of the antenna for communication with the satellite 702 can also be based on a distance from the path 704 to a respective keyhole region. For example, distance 714 from the path 704 to the keyhole region 506A is shorter than the distance 716 from the path 704 to the keyhole region 520A. The control system 318 can take this distance into account and can select an antenna having its respective keyhole region closer to or farther away from the path 704 of a satellite 702.

As noted above, the control system 318 may also schedule different antennas at different times as the satellite 702 passes along its path 704. Antenna 514 may cover part of the path 704 while antenna 506 can be scheduled to cover another part of the path 704. The pattern shown in FIG. 7 may also change if one or more antennas 504, 516, 510, 504, 518, 508, 506, 520 are on a gimbal and thus movable. Thus, for example, antenna 504, with its keyhole 504A in the path of the pathway 704, could be physically moved and assigned or scheduled to track the satellite 702.

Satellite 710 has a path 712 which does not cross any of the keyhole regions (512A, 504A, 516A, 510A, 504A, 518A, 508A, 506A, 520A) therefore, in one aspect, the control system 318 may not need to switch or make a separate assignment for a respective antenna to track the satellite 710. Other factors such as load balancing respective loads on respective antennas, quality of service requirements, priority data, time of day, or other factors can be taken into account when assigning or scheduling an antenna or group of antennas for tracking the satellite 702. For example, if a particular antenna or set of antennas is overloaded with data communications with the plurality of satellites, given the fact that satellite 710 does not cross any of the keyhole regions, any of the antennas in the group could be assigned, including an antenna operating below its communication capacity, to track that satellite 710 along its path 712.

Satellite 706 is also illustrated with its communication path 708 that passes through three keyhole regions (520A, 504A, 516A). The control system 318 can assign one of the other remaining antennas not associated with any of these keyhole regions (520A, 504A, 516A) to track the satellite 706.

FIG. 8A illustrates an example method 800 which can be practiced by a system which includes at least two antennas each having an orientation which results in a first respective keyhole that does not overlap a second respective keyhole. Any step or steps of the method can be performed by a processor as described herein. The method can include one or more steps, in any order, of determining a pathway of a satellite (802) and comparing the pathway to a first radiation pattern of a earth-based first antenna and a second radiation pattern of an earth-based second antenna on earth, wherein the first antenna and the second antenna are each positioned or oriented such that a first keyhole of the first antenna does not overlap a second keyhole of the second antenna, to yield a comparison (804). The method can include selecting, based on the comparison, one of the first antenna or the second antenna to communicate with the satellite along the pathway (806).

The step of selecting, based on the comparison, one of the first antenna or the second antenna to communicate with the satellite along the pathway further can include selecting the first antenna. The first antenna can be selected based on the comparison determining that the pathway of the satellite will avoid the first keyhole of the first antenna. Additional antennas can be organized in group as well in configurations such as a 3×3 matrix, a circle, a square, a rectangle, a linear arrangement of two or more antennas, or other configurations. In some cases, the configuration can be driven by the space available for the group of antennas, a terrain, government regulation, or other factors.

FIG. 8B illustrates another example method 820 from the standpoint of a satellite 320. In this example, a method can include one or more steps, in any order, of transmitting path data to a gateway, where a control system associated with the gateway evaluates the path data and assigns, based on avoiding a keyhole, an antenna from a plurality of antennas associated with the gateway to communicate with an assigned antenna (822) and receiving an instruction to communicate with the assigned antenna (824). The method can include communicating with the assigned antenna across a coverage zone of the gateway (826). This method includes operations performed from the standpoint of the satellite 320. For example, as the satellite 320 enters into a coverage zone of the gateway having, for example, a first antenna 302 and the second antenna 304, the satellite could initially communicate with, for example, the second antenna 304. As part of the initial communication, the satellite 320 can transmit path data which can identify the path 322 as the expected path that the satellite 320 would traverse across the coverage zone for the gateway 300 which includes the first antenna 302 and the second antenna 304. In another aspect, the identification of the path 322 can be passive and determined from the motion data associated with the satellite 320 detected by the system or gateway 300. The control system may also receive path data from another control system or from another entity.

If it is determined that the path 322 will pass over the keyhole 316 of the second antenna 304, that the control system 318, based on an evaluation, can switch to the first antenna 302 as part of the system or gateway 300 that will be able to track the satellite 320 across the coverage zone without the satellite path 322 passing through either of the keyholes 314, 360. Such a switch can include a handshake or a handoff operation as communication between the satellite 320 and the second antenna 304 to the first antenna 302 occurs.

These and other functions can occur on the satellite and all transmissions of data and the receiving of data at the satellite 324 at the system or gateway 300 including control signals, acknowledgment signals, data signals, instruction signals, handoff signals, and so forth are included as within the scope of this disclosure from the standpoint of either the satellite 320 or any component on the system or gateway 300.

In yet another aspect, the method can include providing an instruction to the satellite to move its position in order to avoid a keyhole. For example, assume that no antenna is available or capable of receiving an assignment to communicate with the satellite except an antenna with a keyhole in the path of the satellite. In one example, the control system 318 can provide an instruction to a satellite to adjust its orbit to avoid the keyhole of the antenna that is capable of communicating with the satellite.

FIG. 9 illustrates example computer devices that can be used in connection with any of the systems disclosed herein. In this example, FIG. 9 illustrates a computing system 900 including components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service or module, such as service (module) 1 932, service (module) 2 934, and service (module) 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services or modules 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   determining a pathway of a satellite;
   comparing, via a processor, the pathway to a first radiation pattern of a first antenna on earth and a second radiation pattern of a second antenna on earth, wherein the first antenna and the second antenna are each oriented such that a first keyhole of the first antenna does not overlap a second keyhole of the second antenna, to yield a comparison; and
   selecting, via the processor and based on the comparison, one of the first antenna or the second antenna to communicate with the satellite along the pathway.

2. The method of claim 1, wherein selecting, via the processor and based on the comparison, one of the first antenna or the second antenna to communicate with the satellite along the pathway further comprises selecting the first antenna.

3. The method of claim 2, wherein the first antenna is selected based on the comparison determining that the pathway of the satellite will avoid the first keyhole of the first antenna.

4. The method of claim 1, wherein the selecting further comprises selecting from one of the first antenna, the second antenna and one or more additional antennas.

5. The method of claim 1, wherein the first antenna is oriented at a first tilt and the second antenna is oriented at a second tilt such that the first keyhole and the second keyhole do not overlap.

6. The method of claim 5, wherein the first tilt is the same as the second tilt and the first antenna and the second antenna are tilted in different directions.

7. The method of claim 1, wherein the first antenna and the second antenna are each oriented in a non-vertical direction such that the first keyhole and the second keyhole do not overlap.

8. A system comprising:
   a first antenna having a first orientation;
   a second antenna having a second orientation;

a control system communicating with the first antenna and the second antenna, wherein the control system performs operations comprising:

determining a pathway of a satellite;

comparing the pathway to a first radiation pattern of the first antenna and a second radiation pattern of the second antenna, wherein the first antenna and the second antenna are each positioned such that a first keyhole of the first antenna does not overlap a second keyhole of the second antenna, to yield a comparison; and selecting, based on the comparison, one of the first antenna or the second antenna to communicate with the satellite along the pathway.

9. The system of claim 8, wherein the first antenna and the second antenna are part of either a 3×3 array of antennas, a group of two or more antennas or a linear arrangement of two or more antennas.

10. The system of claim 9, wherein the first antenna is selected based on the comparison determining that the pathway of the satellite will avoid the first keyhole of the first antenna.

11. The system of claim 8, wherein the selecting further comprises selecting from one of the first antenna, the second antenna and one or more additional antennas.

12. The system of claim 8, wherein the first antenna is oriented at a first tilt and the second antenna is oriented at a second tilt such that the first keyhole and the second keyhole do not overlap.

13. The system of claim 12, wherein the first tilt is the same as the second tilt and the first antenna and the second antenna are tilted in different directions.

14. The system of claim 8, wherein the first antenna and the second antenna are each oriented in a non-vertical direction such that the first keyhole and the second keyhole do not overlap.

15. A system comprising:

a processor; and a computer-readable storage device storing instructions which, when executed by the processor, cause the processor to perform operations comprising:

transmitting path data associated with a path of the system to a gateway, where a control system associated with the gateway evaluates the path data and assigns, based on avoiding a keyhole, an antenna from a plurality of antennas associated with the gateway to communicate with an assigned antenna;

receiving an instruction to communicate with the assigned antenna; and communicating with the assigned antenna across a coverage zone of the gateway.

16. The system of claim 15, wherein the control system assigns one of a first antenna or a second antenna from the plurality of antennas to communicate with the system along the path.

17. The system of claim 16, wherein the first antenna is selected by the control system based on a comparison determining that the path of the system will avoid a first keyhole of the first antenna.

18. The system of claim 15, wherein the plurality of antennas comprises at least three antennas.

19. The system of claim 17, wherein the first antenna is oriented at a first tilt and the second antenna is oriented at a second tilt such that the first keyhole and a second keyhole of the second antenna do not overlap.

20. The system of claim 19, wherein the first tilt is the same as the second tilt and the first antenna and the second antenna are oriented in different directions.

* * * * *